(12) United States Patent
Raaf

(10) Patent No.: US 7,065,183 B1
(45) Date of Patent: Jun. 20, 2006

(54) METHOD OF CONTROLLING THE TRANSMITTING POWER IN A MOBILE RADIO SYSTEM AND CORRESPONDING MOBILE RADIO SYSTEM

(75) Inventor: Bernhard Raaf, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/937,497

(22) PCT Filed: Mar. 1, 2000

(86) PCT No.: PCT/DE00/00635

§ 371 (c)(1),
(2), (4) Date: Sep. 25, 2001

(87) PCT Pub. No.: WO00/59129

PCT Pub. Date: Oct. 5, 2000

(30) Foreign Application Priority Data

Mar. 25, 1999 (DE) ................. 199 13 629

(51) Int. Cl.
*H04M 1/64* (2006.01)
(52) U.S. Cl. ............... 379/74; 379/343; 342/378; 455/91; 455/115.1; 455/500
(58) Field of Classification Search ........... 455/501, 455/506, 509, 550, 551, 562, 522, 433, 436
See application file for complete search history.

(56) References Cited

U.S. PATENT DOCUMENTS

| 5,469,471 | A |   | 11/1995 | Wheatley | 375/205 |
| 5,544,156 | A | * | 8/1996 | Teder et al. | 370/342 |
| 5,564,075 | A | * | 10/1996 | Gourgue | 455/69 |
| 6,064,338 | A | * | 5/2000 | Kobayakawa et al. | 342/378 |
| 6,311,075 | B1 | * | 10/2001 | Bevan et al. | 455/562.1 |
| 6,347,234 | B1 | * | 2/2002 | Scherzer | 455/562.1 |
| 6,407,993 | B1 | * | 6/2002 | Moulsley | 370/347 |
| 6,415,163 | B1 | * | 7/2002 | Keskitalo et al. | 455/562.1 |

FOREIGN PATENT DOCUMENTS

EP 0 854 588 A2 7/1998

* cited by examiner

*Primary Examiner*—Fan Tsang
*Assistant Examiner*—Gerald Gauthier
(74) *Attorney, Agent, or Firm*—Bell, Boyd & Lloyd LLC

(57) ABSTRACT

A method is provided for controlling the transmitting power in a mobile radio system a corresponding mobile radio system is also provided. A signal emitted from a transmitter is received by a receiver via a transmission channel of the mobile radio system. The transmitted signal is evaluated and a power control information item is generated based on the result of the evaluation. The power control information item is then transmitted back to the transmitter for adjusting the transmitting power. In order to determine the power control information item, the time response of the transmission channel is estimated and the transmitting power needed in the future is deduced therefrom.

32 Claims, 2 Drawing Sheets

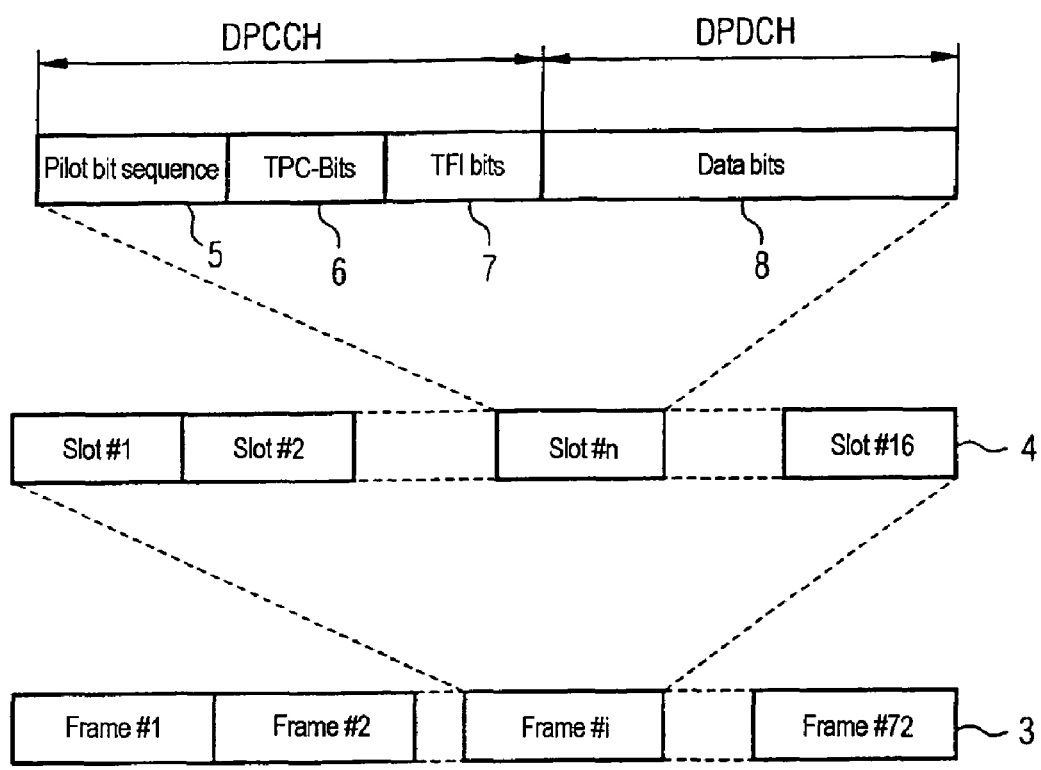

METHOD OF CONTROLLING THE TRANSMITTING POWER IN A MOBILE RADIO SYSTEM AND CORRESPONDING MOBILE RADIO SYSTEM

BACKGROUND OF THE INVENTION

The present invention relates to a method of controlling the transmitting power in a mobile radio system and to a corresponding mobile radio system.

Controlling the transmitting power represents an important feature in mobile radio systems in order to prevent possible interference between individual connections. Preventing interference between connections improves the capacity and quality of the connections and allows the mean transmitting power to be reduced. Thus, the transmission power may be ideally adapted to the transmission requirements, and losses through the transmission channels may be at least partially compensated for.

For the purpose of controlling the transmitting power in a mobile radio system, the signal transmitted by a transmitter is evaluated at the receiver. Power control information is generated based on the power of the received signal and is transmitted back to the transmitter. The transmitter may then adjust the transmitting power as necessary in accordance with the received power control information. The received level and/or the received quality of the transmitted signal can be measured by the receiver and values associated with the received level and/or quality may be transmitted to the transmitter. The transmitter correspondingly corrects the transmitting power in dependence on the received values. This approach is used, for example, in Global System for Mobile Communications (GMB) mobile radio systems. Alternatively, the receiver itself can be adapted to generate nominal values or adjustment commands for adjusting the transmitting power in dependence on the measured level of the received transmit signal. The receiver may then transmit these nominal values or adjustment commands to the transmitter which then adjusts the transmitting power accordingly. This approach is used, for example, in Code Division Multiple Access (CDMA) mobile radio systems and, in particular, is provided in accordance with the current state of Universal Mobile Telecommunication System (UMTS) standardization for UMTS mobile radio systems which are to be operated in accordance with a Wideband Code Division Multiple Access (WCDMA) method. In each approach, the power of the transmitter is always controlled in a manner that takes into consideration the current properties of the transmission channel. In each case, the power needed for satisfactory transmission arrives at the receiver as accurately as possible in spite of fading effects.

However, employing this method, the transmitter can only react to the measurements of the receiver. The inherent delay in waiting for the power information feedback signal from the receiver leads to a degradation of the transmission characteristic of the mobile radio system. This is especially true at higher speeds of the receiver.

One proposal for solving this problem for CDMA mobile radio systems has been to reduce the response time or delay in the power control signal to as short a time as possible. This can be achieved by employing a high frequency a power control signal, having a frequency that is as high as possible within the mobile radio system, and clever interleaving of the timeslots of the uplink and downlink connections. In furtherance of this proposed solution, it has been proposed to shift the frame structure of the uplink connection (the connection from the mobile station to the base station) by 250 µs with respect to the frame structure of the downlink connection (the connection from the base station to the mobile station) in order to provide for transmission of the transmitting power control information signal with a time delay of only one timeslot if the symbol transmission rate of the downlink connection is higher than 16 ksps. This proposal is described, for example, in ARIB, Volume 3, Specification of Air Interface for 3G Mobile System, Version 0.5, Section 3.2.2.1.

However, the procedure described above places a premium on the accurate measurement of the channel impulse response of the corresponding transmission channel. This is essential for assessing the behavior and state of the transmission channel since signal distortion can occur due to certain operating conditions. Such signal distortion renders information transmission impossible in the most extreme cases. Therefore, in mobile radio systems the current channel impulse response is measured in the receiver so that if signal distortion is found, the distortion may be subsequently corrected if necessary, using corresponding equalizers.

SUMMARY OF THE INVENTION

The present invention provides a method for locating a vehicle as well as a system for doing the same. According to the method of the invention, position data are determined by a positioning device at the vehicle. Once the position data are determined, they are transferred to a mobile radio terminal, where they may be displayed in a variety of different formats.

In light of the preceding background, an object of the present invention is to create an improved method of controlling the transmitting power in a mobile radio system. The present invention further provides a corresponding mobile radio system which eliminates the influence of delays in the power control system as completely as possible.

According to an embodiment of the invention, a method for controlling the transmitting power in a mobile radio system is provided. According to the power control system of the mobile radio system, a signal transmitted by a transmitter is received by a receiver via a transmission channel of the mobile radio system. The signal received by the receiver is evaluated and a power control information item is generated in dependence on the evaluation of the received signal. The power control information item is then transmitted to the transmitter. The power of the signal transmitted by the transmitter is then adjusted based on the result of the estimation of the behavior of the transmission channel. Finally, a step is performed in which a power control information item is generated based on the estimated necessary transmission power, and is transmitted to the transmitter.

Thus, according to the invention, the behavior of the transmission channel is estimated and the necessary transmitting power is estimated based on the estimated channel behavior. The power control information to be transmitted to the transmitter can then be generated on the basis of the estimated necessary transmitting power.

The step of estimating the behavior of the transmission channel involves estimating the behavior of the channel over time, as well as predicting a future state of the transmission channel. Thus, the transmitting power needed in the future can be calculated based on the estimated behavior and state of the transmission channel. In contrast to the known state of the art, the power control information which represents the basis for adjusting the transmitting power of the transmitter is not based on the instantaneous measured value of the received level or of the received quality of the transmit signal but on the above-described prediction of the channel state and the transmitting power needed in future. In this manner, the influence of delays can be eliminated in the control of the transmitting power if the behavior of the transmission channel can be predicted with sufficient accuracy. The behavior of the channel state can be estimated, for example, via the channel impulse response.

The method of determining power control information of the present invention can be combined with other methods for determining power control information and the proportion of the power control information determined according to the method of the present invention to be transmitted to the transmitter may be reduced or completely eliminated with increasing speed of the receiver or, respectively, the mobile station, since accurate estimates become ever more difficult with increasing speeds.

In addition to a method for controlling transmitting power in a mobile radio system, the present invention further provides a mobile radio system having a transmitting power control feature. The mobile radio system includes a transmitter and a receiver. The receiver receives a signal from the transmitter via a transmission channel of the mobile radio system. The receiver is adapted to evaluate the received signal and generate a power control information item in dependence thereon. The receiver if further adapted to transmit the power control information item to the transmitter. The transmitter, in turn, is constructed in a manner such that it adjusts the transmitting power of the transmitted signal in dependence on the power control information received from the receiver. The receiver generates the power control information item by first estimating the behavior of the transmission channel based on the received signal transmitted from the transmitter, and determines the necessary transmitting power based on the result of the estimated behavior of the transmission channel. The receiver further generates and transmits the power control information item to the transmitter.

BRIEF DESCRIPTION OF THE FIGURES

FIG. 3 is a representation of the frame and timeslot pattern for a so-called downlink connection according to the current state of UMTS standardization.

DETAILED DESCRIPTION OF THE INVENTION

Figure 2:
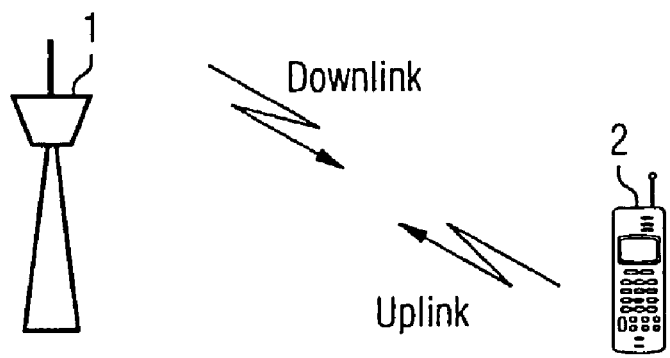
FIG. 2 is a diagram of a mobile radio system.

FIG. 2 shows the communication links between a base station 1 and a mobile radio station 2 of a mobile radio system. A connection from the base station 1 to the mobile part 2 is called the downlink or forward link connection and a connection from the mobile part 2 to the base station 1 is called the uplink or reverse link connection. To control the power of the downlink, the respective received signal is evaluated in the mobile station 2 and, depending on the result of the evaluation, a power control information item is generated by the mobile station 2 and sent back to the base station 1 so that the base station 1 can correspondingly adjust the transmitting power of the downlink. To control the uplink, the received signal is evaluated in the base station 1, where the power control information is generated and the mobile station 2 is instructed for power matching.

The power information item is transmitted in dependence on the respective mobile radio system linking with a predetermined frame structure.

FIG. 3 shows the frame and timeslot structure for a downlink connection via a UMTS mobile radio channel, also called DPCH (Dedicated Physical Channel). The present invention is preferably applied to corresponding UMTS mobile radio systems. The frame structure with a period of 720 ms includes, in particular, 72 identically structured frames 3 having with a frame period of 10 ms. Each frame, in turn, includes 16 timeslots 4. Each timeslot has a period of 0.625 ms. Each timeslot 4 comprises bit information which is divided into a logical control channel known as a Dedicated Physical Control Channel (DPCC) and a logical data channel Dedicated Physical Data Channel (DPDC). The bits of the DPCCH section form a pilot bit sequence 5 and so called Transmitter Power Control (TPC) controlled bits 6 and Transmitter Format Identifier (TFI) control bits 7. The DPDCH section forms the user data bits 8. The structure shown in FIG. 3 can be found, for example, in the document ETSI STC SMG2 UMTS-L1: Tdoc SMG2 UMTS-L1 221/98.

The pilot bit sequence 5 is used for estimating the channel impulse response during a so called training sequence, as already mentioned above, and corresponds to a known bit pattern. If the pilot bit sequence is called s(t), the channel impulse response h(t) and the received signal or, respectively, the training sequence is called r(t), the following relationship holds true:

$$r(t)=s(t)*h(t).$$

The receiver can thus determine or estimate the channel impulse response h(t) of the mobile radio channel by comparing the received signal r(t) with the known pilot bit sequence s(t). The signal-matched filters, for example, may be used for this purpose to calculate the channel impulse response h(t) by calculating the correlation between the received signal r(t) and the pilot bit sequence s(t).

The TPC bits 6 comprise the power control information. In UMTS mobile radio systems the received signal is evaluated and compared with predetermined quality requirements or reference values in the receiver. Depending on this comparison, the receiver generates a control command and transmits the control command to the transmitter via the TPC bit field in order to instruct the transmitter to correspondingly adapt the transmitting power.

In the text which follows, the principle forming the basis of the present invention is explained with reference to FIG. 1.

The time response or state of the transmission channel is predicted in order to be able to estimate the transmitting power needed in future based on the predicted future state of the transmission channel. The behavior of the transmission channel can be assessed via the channel impulse response.

Figure 1:
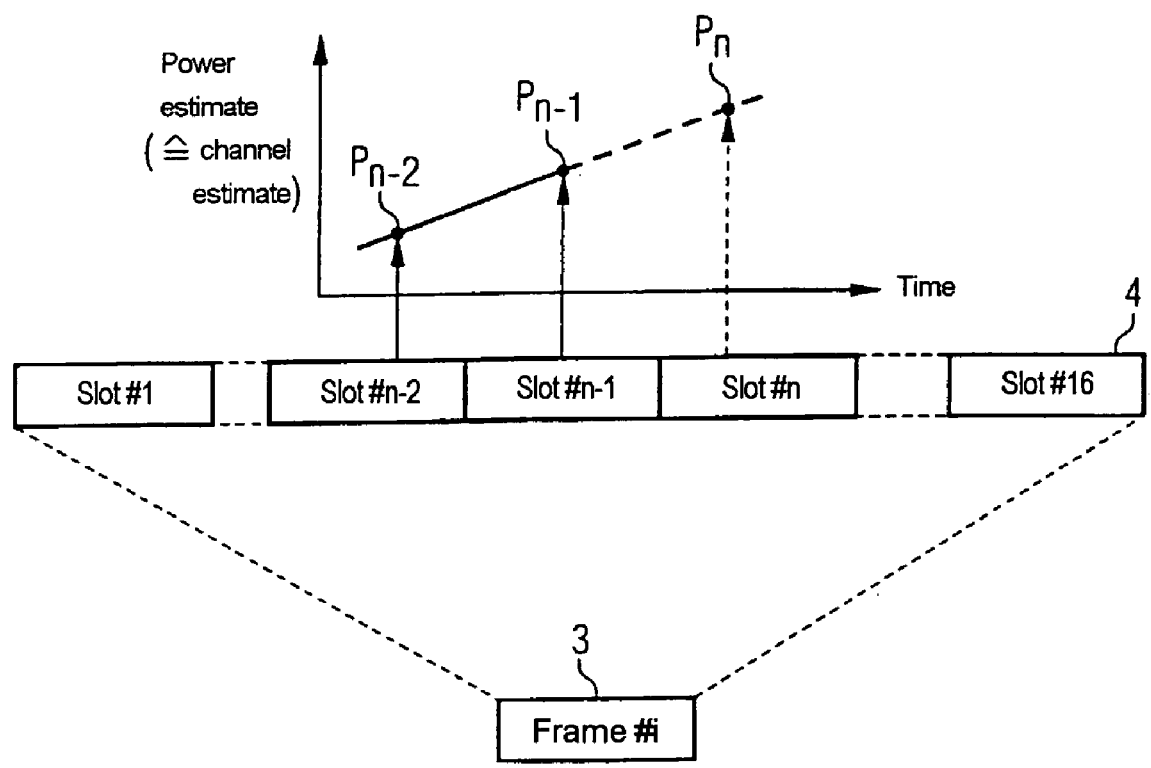
FIG. 1 is a diagram explaining the principle forming the basis of the present invention.

In the representation shown in FIG. 1 it will be assumed that, at the moment, the transmitting power for timeslot n is to be determined in order to be able to transmit a corresponding power control command to the transmitter. The values of the channel impulse responses, measured by means of the pilot bit sequences 5 transmitted in the respective timeslots for timeslots n-2 and n-1, and the values $P_{n-2}$ and $P_{n-1}$, respectively, for the transmitting power determined for these timeslots are known in the receiver such that the receiver can extrapolate the future channel state or the transmitting power $P_n$ needed for timeslot n in the future on the basis of these known values. This extrapolation is indicated by a dashed line in FIG. 1. The extrapolated power value $P_n$ forms the basis for the receiver controlling the transmitting power, by forming the basis for the power control information 6 which the receiver transmits to the transmitter.

Thus, variation of the fast fading may predicted as far as possible, assuming, as a rule, Rayleigh fading. When so called rake receivers are used, the prediction is performed for every rake finger. In rake receivers, the received signal is processed in a number of paths, the so called rake fingers. Each of these rake fingers is adjusted with optimized phase angle to a multi-path signal in order to achieve an increasing gain with the presence of multipath signals which arrive at the receiving antenna with different propagation delay. Deep fading dips occur whenever the channel impulse response exhibits an (approximate) zero transmission for all or at least the dominant paths. This circumstance can be reliably predicted if both the intervals of the estimation of the channel impulse response and the period of prediction are selected to be shorter than the so called coherence time of the transmission channel, in order to provide for reasonable data detection. The period of prediction is shorter than the coherence time of the transmission channel at least at low to medium speeds of the mobile station 2.

As shown in FIG. 1, the previously measured channel impulse response can be linearly extrapolated for predicting the transmitting power needed in future. Naturally, however, other approaches are also conceivable.

When the mobile station 2 is moving at high speeds, it can be difficult to accurately and reliably predict the future behavior of the transmission channel and the transmitting power needed in future. For this reason, an aspect of the present invention is to combine the principle of estimating the behavior of the transmitting channel and predicting the necessary transmission power according to the invention with other power control principles. The power control information can be determined according to these combined principles and the proportion of the prediction that can be ascribed to the principles that form the basis of the present invention for determining the power control information that is sent from the receiver to the transmitter can be reduced or completely eliminated based on the characteristic behavior of the transmission channel, such as when the mobile station 2 is traveling at higher speeds.

By combining power control principals, the method according to the present invention can be used only when the mobile station 2 is traveling in a particular speed range which is not too high, while at other times the power control information 6 may be conventionally determined by means of the instantaneously measured level of the received signal since the conventional non-predictive power control method is quite adequate for satisfactory control of the transmitting power, for example at low speeds of the mobile station 2.

However, it is particularly advantageous if the switching between the power control method of the present invention and alternative methods for determining the power control information is not "hard" but "soft" or gradual. Thus, the nominal value used for the transmitting power in a certain speed range can be, for example, a value which is composed of 70% of the current measured value of the received power and 30% of the value predicted according to the invention. In other words, the nominal value for the transmitting power may be based on a weighting of various values which have been determined in different ways, one of these values having been determined according to the invention. In this case, it can be said that the received power and the nominal transmitting power derived therefrom are not calculated in advance by one timeslot 4 but by a fraction a of a timeslot, a representing a correction factor and reflecting the reliability of the prediction. The correction factor a can have values between 0 and 1 and is 0.3 in the example described above.

In the above description, it has been assumed that the behavior or the state of the transmission channel is predicted by estimating the channel impulse response. Alternatively, it is also possible to predict the so called carrier/interferer ratio C/I in order to derive the transmitting power needed in future therefrom. Similarly, it is also possible to predict only the component C (corresponding to the carrier signal) or the component I (corresponding to the interference) in order to estimate the transmitting power needed in future.

The invention claimed is:

1. A method for controlling the transmitting power in a mobile radio system, in which a signal is transmitted from a transmitter via a transmission channel of the mobile radio system and received by a receiver, the method comprising the steps of:
   evaluating the signal received by the receiver
   generating a power control information item based on the evaluation of the received signal;
   transmitting the power control information item to the transmitter;
   adjusting the transmitting power at the transmitter in dependence on the power control information item;
   estimating the behavior of the transmission channel;
   estimating the transmitting power needed based on the result of the estimation of the behavior of the transmission channel;
   wherein the power control information item is generated on the basis of the estimated transmitting power needed and is transmitted to the transmitter; and
   the estimated behavior of the transmission channel is determined by prediction and the transmitting power needed in future is estimated in dependence on the result of the prediction of the behavior of the transmission channel.

2. The method as claimed in claim 1, wherein the behavior of the transmission
   channel state is estimated by predicting the channel impulse response.

3. The method as claimed in claim 1, wherein the behavior of the transmission channel state is estimated by predicting the carrier/interferer ratio.

4. The method as claimed in one of claim 3, wherein the behavior of the transmission channel is estimated at regular intervals, the interval between the individual estimates of the behavior of the transmission channel and the period over which the behavior of the transmission channel is predicted being selected to be shorter than a coherence time of the transmission channel.

5. The method as claimed in claim 4 wherein the value of the power control information item is adjusted to be linearly dependent on the result of the estimation of the behavior of the transmission channel.

6. The method as claimed in claim 5 wherein the power control information item is generated in dependence on the estimated behavior of the transmission channel and also additionally in dependence on the instantaneously measured received level of the signal received by the receiver, the proportion of the estimated behavior of the transmission channel in the generation of the power control information item being adjusted in dependence on the characteristic behavior of the transmission channel.

7. The method as claimed in claim 6, wherein one of the transmitter and receiver is a mobile unit, and wherein the proportion of the estimated behavior of the transmission channel in the generation of the power control information is reduced at higher speeds of the mobile unit.

8. The method as claimed in claim 7, further comprising the step of estimating the instantaneous speed of the mobile unit and wherein the proportion of the estimated behavior of the transmission channel in the generation of the power control information item is adjusted in dependence on the estimated speed of the mobile unit.

9. The method as claimed in claim 8, further comprising the step of measuring the channel impulse response of the transmission channel, and estimating the coherence time of the transmission channel in dependence on the measured channel impulse response in order to derive the instantaneous speed of the mobile unit therefrom.

10. The method as claimed in one of claim 2, wherein the behavior of the transmission channel is estimated at regular intervals, the interval between the individual estimates of the behavior of the transmission channel and the period over which the behavior of the transmission channel is predicted being selected to be shorter than a coherence time of the transmission channel.

11. The method as claimed in claim 10 wherein the value of the power control information item is adjusted to be linearly dependent on the result of the estimation of the behavior of the transmission channel.

12. The method as claimed in one of claim 1, wherein the behavior of the transmission channel is estimated at regular intervals, the interval between the individual estimates of the behavior of the transmission channel and the period over which the behavior of the transmission channel is predicted being selected to be shorter than a coherence time of the transmission channel.

13. The method as claimed in claim 12 wherein the value of the power control information item is adjusted to be linearly dependent on the result of the estimation of the behavior of the transmission channel.

14. The method as claimed in claim 3 wherein the power control information item is generated in dependence on the estimated behavior of the transmission channel and also additionally in dependence on the instantaneously measured received level of the signal received by the receiver, the proportion of the estimated behavior of the transmission channel in the generation of the power control information item being adjusted in dependence on the characteristic behavior of the transmission channel.

15. The method as claimed in claim 14, wherein one of the transmitter and receiver is a mobile unit, and wherein the proportion of the estimated behavior of the transmission channel in the generation of the power control information is reduced at higher speeds of the mobile unit.

16. The method as claimed in claim 15, further comprising the step of estimating the instantaneous speed of the mobile unit and wherein the proportion of the estimated behavior of the transmission channel in the generation of the power control information item is adjusted in dependence on the estimated speed of the mobile unit.

17. The method as claimed in claim 16, further comprising the step of measuring the channel impulse response of the transmission channel, and estimating the coherence time of the transmission channel in dependence on the measured channel impulse response in order to derive the instantaneous speed of the mobile unit therefrom.

18. The method as claimed in claim 3 wherein the power control information item is generated in dependence on the estimated behavior of the transmission channel and also additionally in dependence on the instantaneously measured received level of the signal received by the receiver, the proportion of the estimated behavior of the transmission channel in the generation of the power control information item being adjusted in dependence on the characteristic behavior of the transmission channel.

19. The method as claimed in claim 18, wherein one of the transmitter and receiver is a mobile unit, and wherein the proportion of the estimated behavior of the transmission channel in the generation of the power control information is reduced at higher speeds of the mobile unit.

20. The method as claimed in claim 19, further comprising the step of estimating the instantaneous speed of the mobile unit and wherein the proportion of the estimated behavior of the transmission channel in the generation of the power control information item is adjusted in dependence on the estimated speed of the mobile unit.

21. The method as claimed in claim 20, further comprising the step of measuring the channel impulse response of the transmission channel, and estimating the coherence time of the transmission channel in dependence on the measured channel impulse response in order to derive the instantaneous speed of the mobile unit therefrom.

22. The method as claimed in claim 2 wherein the power control information item is generated in dependence on the estimated behavior of the transmission channel and also additionally in dependence on the instantaneously measured received level of the signal received by the receiver, the proportion of the estimated behavior of the transmission channel in the generation of the power control information item being adjusted in dependence on the characteristic behavior of the transmission channel.

23. The method as claimed in claim 22, wherein one of the transmitter and receiver is a mobile unit, and wherein the proportion of the estimated behavior of the transmission channel in the generation of the power control information is reduced at higher speeds of the mobile unit.

24. The method as claimed in claim 23, further comprising the step of estimating the instantaneous speed of the mobile unit and wherein the proportion of the estimated behavior of the transmission channel in the generation of the power control information item is adjusted in dependence on the estimated speed of the mobile unit.

25. The method as claimed in claim 24, further comprising the step of measuring the channel impulse response of the transmission channel, and estimating the coherence time of the transmission channel in dependence on the measured channel impulse response in order to derive the instantaneous speed of the mobile unit therefrom.

26. The method as claimed in claim 1 wherein the power control information item is generated in dependence on the estimated behavior of the transmission channel and also additionally in dependence on the instantaneously measured received level of the signal received by the receiver, the proportion of the estimated behavior of the transmission channel in the generation of the power control information item being adjusted in dependence on the characteristic behavior of the transmission channel.

27. The method as claimed in claim 26, wherein one of the transmitter and receiver is a mobile unit, and wherein the proportion of the estimated behavior of the transmission channel in the generation of the power control information is reduced at higher speeds of the mobile unit.

28. The method as claimed in claim 27, further comprising the step of estimating the instantaneous speed of the mobile unit and wherein the proportion of the estimated behavior of the transmission channel in the generation of the power control information item is adjusted in dependence on the estimated speed of the mobile unit.

29. The method as claimed in claim 28, further comprising the step of measuring the channel impulse response of the transmission channel, and estimating the coherence time of the transmission channel in dependence on the measured channel impulse response in order to derive the instantaneous speed of the mobile unit therefrom.

30. A mobile radio system comprising;
- a transmitter;
- a receiver for receiving a signal of the transmitter transmitted via a transmission channel of the mobile radio system and for evaluating the received signal in order to generate a power control information item in dependence thereon, and to transmit the power control information item to the transmitter;
- the transmitter being constructed in a manner such that the transmitting power is adjusted in dependence on the power control information of the receiver;
- the receiver being constructed in a manner such that the behavior of the transmission channel is estimated in dependence on the received signal, and the receiver determines the needed transmitting power based on the result of the estimation of the behavior of the transmission channel, and wherein the receiver generates the power control information item and transmits the power control information item to the transmitter on the basis of the determined necessary transmitting power.

31. The mobile radio system as claimed in claim 30, wherein the receiver generates the power control information item in the form of a command for adjusting the transmitting power directed to the transmitter.

32. The mobile radio system as claimed in claim 31, wherein the mobile radio system is a CDMA mobile radio system.

\* \* \* \* \*